(No Model.) 3 Sheets—Sheet 1.
G. R. COTTRELL.
APPARATUS FOR MIXING GAS AND AIR.
No. 447,299. Patented Mar. 3, 1891.
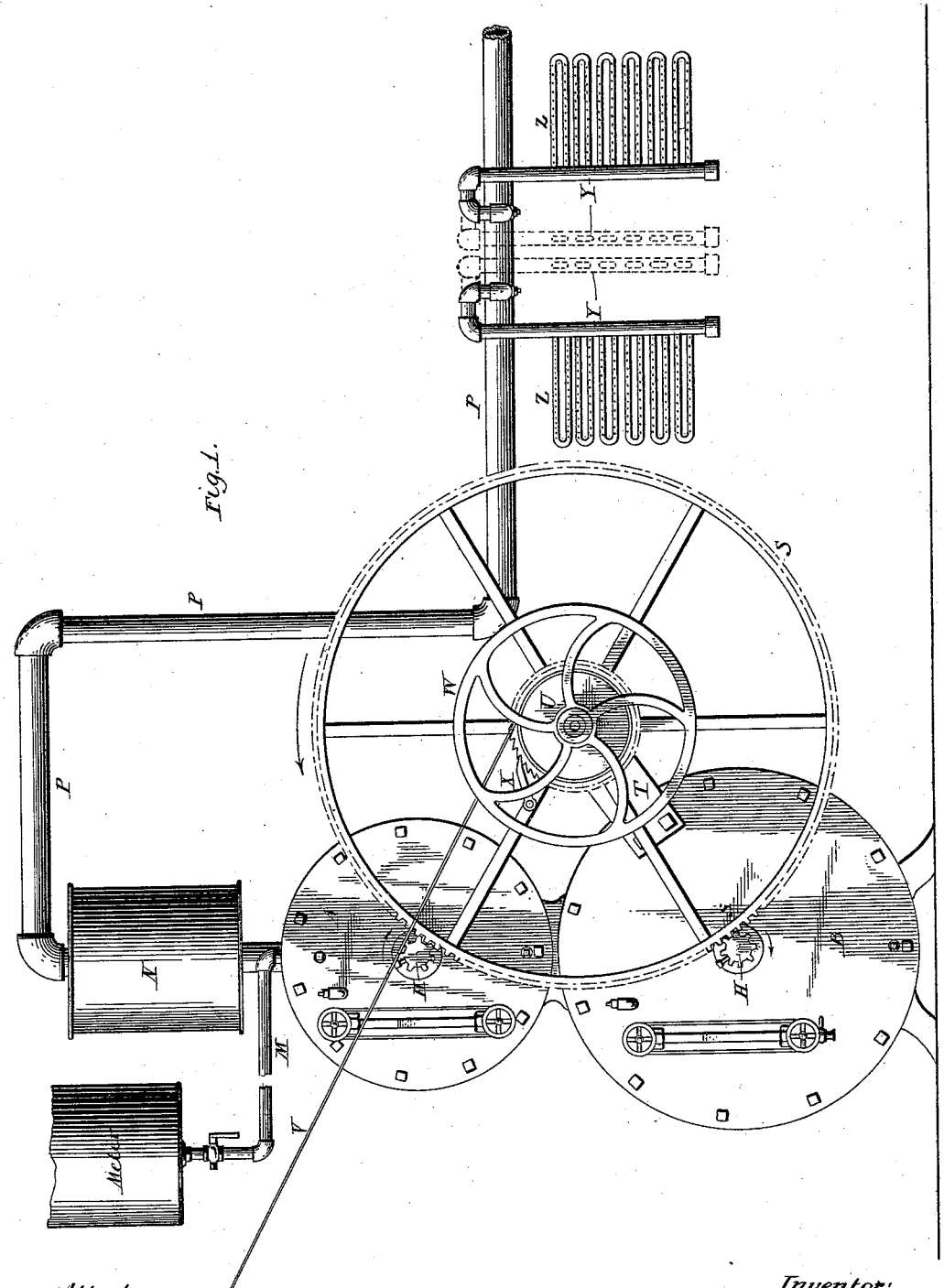
Attest:
Wm. A. Norton
M. E. Brundage
Inventor:
G. R. Cottrell
By W. W. Dudley
Attorney.

(No Model.) 3 Sheets—Sheet 2.
G. R. COTTRELL.
APPARATUS FOR MIXING GAS AND AIR.
No. 447,299. Patented Mar. 3, 1891.
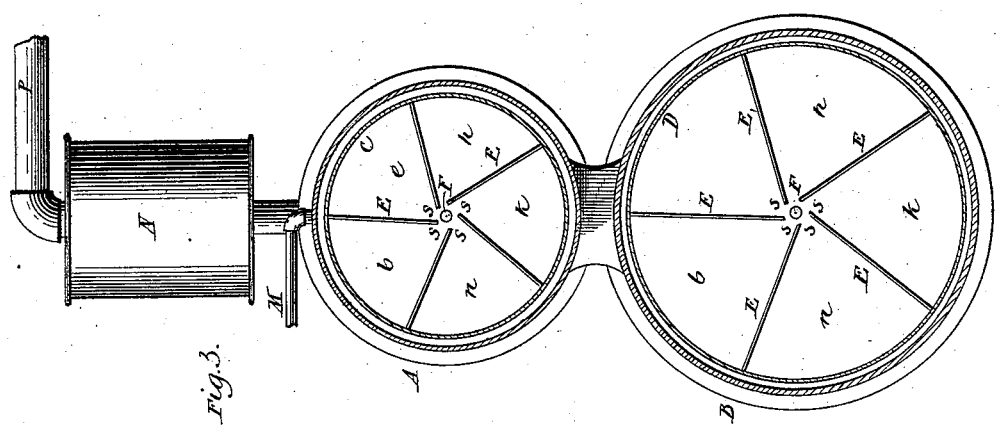
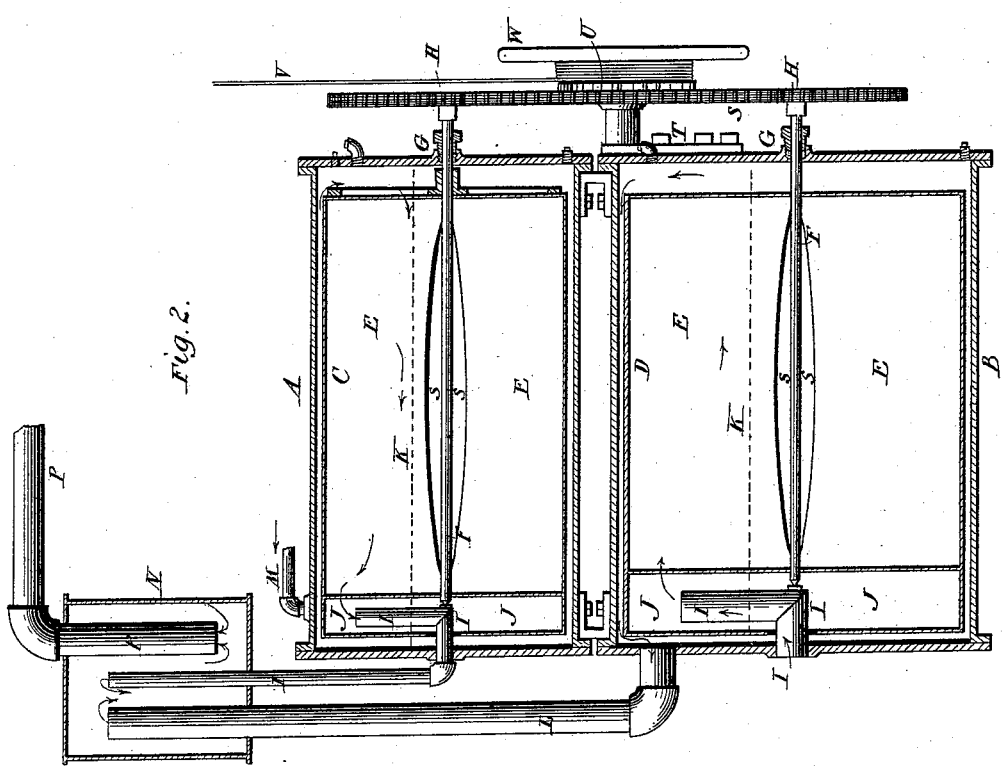
Attest
W? T Norton
W? Brundage
Inventor
G. R. Cottrell
By his Attorney W. W. Dudley (No Model.) 3 Sheets—Sheet 3.
G. R. COTTRELL.
APPARATUS FOR MIXING GAS AND AIR.
No. 447,299. Patented Mar. 3, 1891.
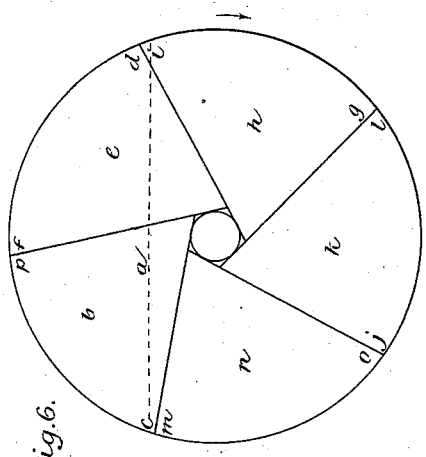
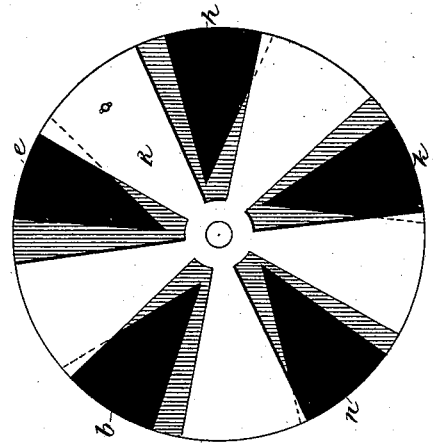
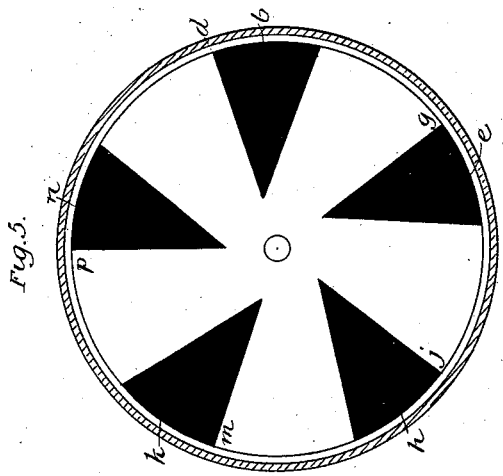
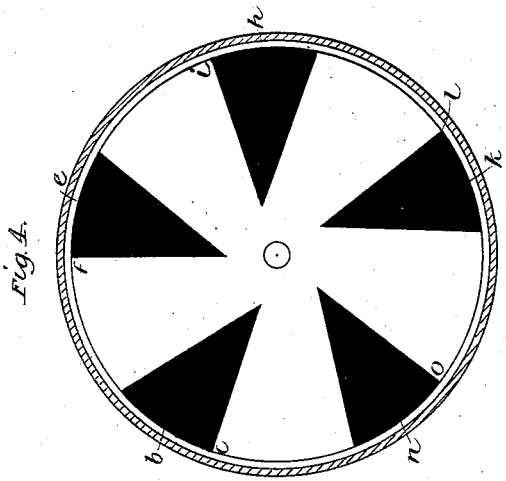
Witnesses
Inventor
G. R. Cottrell
By W. W. Dudley
Attorney

UNITED STATES PATENT OFFICE.

GEORGE R. COTTRELL, OF NEW YORK, N. Y., ASSIGNOR OF ONE-HALF TO WM. W. DUDLEY AND F. L. BROWNE, OF WASHINGTON, DISTRICT OF COLUMBIA.

APPARATUS FOR MIXING GAS AND AIR.

SPECIFICATION forming part of Letters Patent No. 447,299, dated March 3, 1891.

Application filed June 10, 1890. Serial No. 354,932. (No model.)

*To all whom it may concern:*

Be it known that I, GEORGE R. COTTRELL, a citizen of the United States, residing at New York, in the county of New York and State of New York, have invented certain new and useful Improvements in Apparatus for Mixing Gas and Air; and I do hereby declare the following to be a full, clear, and exact description of the invention, such as will enable others skilled in the art to which it appertains to make and use the same.

The object of my invention is to utilize the ordinary illuminating-gas as an economical and acceptable fuel for heating and cooking purposes and to obtain therefrom all the heat properties. For this purpose I have found it necessary to mix air supplied by induction with gas supplied under pressure in measured proportions under equal pressures, in order to produce a perfectly homogeneous mixture to insure the combustion of all the properties of the gas to obtain all the heat the latter can produce. The mixing of gas supplied from the meter under pressure with atmospheric air supplied by induction, so that both will be mixed under the same pressure in the right proportions, is a novel method, so far as I know and find, for preparing gas for heating and cooking purposes, or for any purpose. For effecting these objects I have produced a mixer wherein the normal pressure of the gas as it comes from the meter is measured and delivered under the same pressure as atmospheric air supplied by induction, so that the two aeriform volumes come together under the same velocity, and are therefore perfectly mixed and delivered under the same pressure at the point of combustion by a supply-pipe provided with suitable burner appliances for heating and for cooking purposes. The mixer for this purpose is composed of two independent water-containing cylinders, each having a screw-drum of novel construction, one for measuring the gas and the other for measuring the air, so that when revolved together they produce the result stated, in which the gas is delivered to the supply-pipe at the same velocity and pressure as the air which is supplied to the same pipe by induction, so as to properly mix them to obtain the greatest degree of heat in their combustion. In such construction the measuring compartments, both for the air and for the gas, are caused to operate with a balanced resistance to the inlet and discharge of the gas as it is measured in the gas-cylinder. This balanced action is obtained by a certain and particular construction and arrangement of the screw-compartments, whereby they are sealed by the water at every point between their receiving and their discharging ends during the revolution of such compartments—that is, so that either the receiving or the discharging opening is always sealed—so that the pressures due to such action are equal at all points in both measuring-drums, and therefore in every position of their measuring-compartments the resistance to the revolution of the connected screw-drums in the water is balanced, so as to give a continuous and uninterrupted measured flow and pressure of the mixture under all conditions of the velocity in the revolutions of the screw-drums.

In the accompanying drawings I have illustrated my air and gas mixer as applied for use with a broiling device, which I call a "perforated broiler," and which is applied as an adjustable bracket to the pipe which supplies the mixture; but it will be understood that this pipe may be used for supplying the mixture to any suitable cooking and heating appliances.

In the drawings, Figure 1 shows in side elevation my improved air and gas mixing apparatus and a perforated broiling device supplied thereby. Fig. 2 is a longitudinal vertical section of the mixing apparatus, and Fig. 3 is a vertical cross-section of the same. Fig. 4 shows the receiving end of the screw-drum, and Fig. 5 the discharging end of the same. Fig. 6 is a diagram of one of the screw-drums to illustrate the balancing action of the gas-pressures under the receiving and discharging flow in the measuring-compartments, and Fig. 7 shows a register-plate applied to the receiving end of the gas-measuring screw-drum to allow the water-level in the cylinder to be raised for regulating the volume of the gas-containing space of the screw-compartments according to its gravity.

The mixing apparatus consists of two independent water-containing cylinders A and B, which I prefer to arrange in superimposed relation for compactness and to give the advantage of securing them directly together so that they practically form one casting, and thereby maintain their fixed relation upon a single support. These cylinders are of unequal capacity in diameter, but are of equal length, and the cylinder of greatest capacity is supported upon legs and forms the air-cylinder, while the top cylinder of less capacity forms the gas-cylinder. Each of these cylinders contains a drum C and D, connected to revolve together, of a size not quite filling the cylinder-chamber and constructed with spiral partitions or vanes E, which form compartments $b\ e\ h\ k\ n$ open at both ends, and which constitute the measuring or proportioning compartments for the air and for the gas, and are of equal length, while corresponding with the unequal diameters of the cylinders. The compartments of the drum are of equal area, and after many tests and experiments I find that these compartments should be formed by five division-vanes, as being the only construction that will give the proper sealing action of the compartments in the water during the revolution of the drum, and that such sealing action is a necessity to give the required balancing action of the pressures of the gas upon the drum for the purpose of giving the proper measuring or proportioning action of these screw-formed compartments in their delivery of the gas under pressure and of the air by induction at the same velocity. While the particular and certain construction of compartments, as stated, is a positive requirement it is also a positive requirement that these screw-formed compartments shall have a length greater than their diameter, and that the screws shall have considerable pitch in order that the opening and the closing of each compartment in the water shall be simultaneous at one point in every revolution of the drum to give the required check to the gas-pressure to hold such pressure in abeyance, so that the air and the gas shall be delivered in such relative proportions as to produce the greatest heat in their combustion.

Each screw-formed drum is mounted upon a central shaft F, one end of which has a bearing in a stuffing-box G in one of the cylinder-heads, extends outward therefrom, and has a pinion H, while the other end of said shaft has a bearing in the inner end of an elbow-pipe I, which rises above the water-level and opens into a chamber J at the end of the drum, into which chamber the screw-formed compartments open. In the air-drum D this pipe $I^2$ forms the inlet for the air, and in the gas-drum the pipe I forms the outlet for the gas, as shown in Fig. 2, while at the other ends of these drums the compartments open directly into the cylinder-chambers, which it will be understood are supplied with water on a level K above the axis of the revolving drums. The outlet air-pipe L connects with the cylinder-chamber above the water-level, while the inlet gas-pipe M connects with the cylinder-chamber above the water-level, and the outlet gas and air pipes I and L may terminate in and near the top of the mixing-chamber N, into which the outlet supply-pipe P extends and terminates near the bottom of said mixing-chamber N to convey the mixture to the point or points of combustion.

Referring to Fig. 6, the balancing and sealing action of the screw-formed compartments is effected as follows: $a$ indicates the water-level in the gas-cylinder chamber and in the screw-formed measuring-compartments. $b$ is a compartment extending spirally lengthwise from $c$ to $d$, and in the position of the drum therein shown is full of gas and is just water-sealed at both ends—that is, it is just closing at the inlet $c$ and opening at the outlet $d$. $e$ is a compartment extending spirally lengthwise from $f$ to $g$ and is partly full of gas and partly full of water and is sealed at the discharge end. $h$ is a compartment extending spirally lengthwise from $i$ to $j$ and is full of water and is sealed at both ends. $k$ is a compartment extending spirally lengthwise from $l$ to $m$ and is full of water and is sealed at both ends, while $n$ is a compartment extending spirally from $o$ to $p$ and is partly full of gas and partly full of water and is open at its discharge end. By this construction of the five measuring-compartments it will be seen that there is no resistance to the free revolution of the drum by the pressure of the gas passing into the compartment $b$, because the resistance on the drum is equal at both ends by reason of its filling and discharging equally and simultaneously. Compartment $k$, being full of water and having no resistance due to the pressures in the filling and discharging actions by reason of neither receiving or discharging, therefore balances the gas-filling chamber $b$, while the resistance due to the pressures in the filling and discharging action of the other compartments $e$, $h$, and $n$ are equal at all points and balance each other, so that the gas and air are measured under equal pressures and discharged under equal velocities from each compartment.

The length and pitch of the spiral compartments must be such as will cause the inlet-opening and the outlet-opening to open and to close in the water, so that the seal in each will be perpetual or uninterrupted, and thereby cut off the pressure of the gas as it is being conveyed through the screw-compartment from the pressure with which it enters the cylinder-chamber from the meter, for were this seal broken by uncovering the outlet-opening before the inlet-opening is closed in the water the gas would be forced by its pressure through the screw-compartments and would fail to be measured, and, moreover, would act with the full resistance of its pressure from the meter by packing in the cylinder-chamber. By my construction, however, two of the screw-formed compartments are receiving the gas under the meter-pressure and discharging it at a low pressure, while the fifth compartment is under water and inactive, there being neither pressure or resistance within it. This operation gives the balanced action to the gas-drum because it equalizes the resistance caused by the pressure of the gas passing into it, and the revolution of the screw-formed compartment-drum is thus made uniform, and the gas delivered under the same pressure that the air is, because the action of the air-drum is the same as that of the gas-drum in effecting and maintaining the seal of the measuring-compartments. This uniform delivery of the gas and air in respect to their pressures and velocity renders it easy to determine and to maintain the proper proportions necessary to perfect combustion and the production of the greatest heat thereby. For this purpose I find that the capacity of the screw-delivery should be about one of gas to four of air in using the ordinary illuminating-gas.

Without the sealing action which I have described the screw-compartments would act merely as induction-passages, and there could be no measuring or proportioning action in the screw-compartments, as the gas would both enter and pass out under the full pressure from the meter, while the air would enter and pass out by induction. By my invention the gas is caused to enter the screw-compartment by the full pressure from the meter and to leave it under a comparatively low pressure created solely by the revolution of the drum in the water, and which is necessary to deliver the gas to the burners at a low pressure. By reason of sealing the compartments, as stated, the normal pressure of the gas from the meter is cut off and rendered non-active within the screw-compartments, so that it can only leave said compartments under a low pressure created by the action of the screw in the water. The air-drum operates in the same manner, and in this way the gas and the air pass out of the screw-compartments under the same pressure in the measured proportions which I have stated. The proportion of gas and air which I have stated as being required to give a combustion that burns up all the properties of the gas, reduces its gravity or richness to such a low condition that only a low pressure is required at the burners.

The rotation of the drums is regulated by the weight Q, which is only sufficient to revolve the connected drums in the water, and in event of the weight running down and the stopping of the drums a perfect check upon the inflow of the gas is made by the water seal, and there can be no discharge of the gas at the burners.

The screw-formed measuring-compartments communicate by openings s in the middle of their length and at the junction of the shaft for the purpose of permitting the water to retain a uniform level in the compartments by reason of the freedom of the water in passing from one compartment to the other as the screw-drum revolves. This leveling action of the water avoids any resistance to the revolution of the screw-drum which would be caused by the lifting of the water within the compartments as the drum revolves.

For regulating the volume of the gas according to its gravity or richness to the measuring-compartments, I provide for raising the water-level in the cylinder, which regulation is effected by means which act to lessen the area of the inlet-openings of the said compartments. A register-plate R for this purpose is secured by a sleeve upon the shaft of the drum at the inlet end thereof, and is made adjustable to close the said openings more or less, as may be required, and thereby change the sealing-points of the screw ends to the increased height of the water, so as to preserve the sealing of the compartments in the way described. For adjusting this register I provide a hole in the cylinder-head, through which a pin or screw-driver may be inserted to set the register by a clamp-screw, and then closing said hole by a plug. The two cylinders are firmly bound together by brackets secured directly to the flanged heads, as seen in Figs. 2 and 3. A large spur-gear S engages the pinions H on the shafts of the screw-drums, so as to cause the latter to revolve in the same direction at the same speed, and this spur-gear is mounted by a stud in a bracket T, which is bolted to the lower cylinder-head. This spur-gear has a winding-drum U for the weight-cord V and a hand-wheel W, by which to wind up the weight which revolves the screw-drums. A ratchet-clutch X is used with the winding-drum.

The broiling device which I have shown consists of two depending pipes Y, secured by suitable flexible couplings to the supply-pipe, and each depending pipe is provided with a series of jet-pipes Z, arranged similar to a gridiron and adapted to be swung toward and from each other, so as to direct the gas-jets upon the meat, which is supported between the jet-pipes. In the drawings, Fig. 1, these jet-pipes are shown as standing in open relation to each other; but when in use they are brought together, as shown in dotted lines, so that the gas-jets impinge directly upon the article being broiled, and will cook it perfectly free of the taste or smell of the gas, leaving the flavor of the article unchanged in the least degree.

The article being cooked is suspended from the top of the burner-arms down between the jet-pipes and the article is roasted uniformly, perfectly, and quickly, leaving it sweet and juicy, all of which is due solely to the proportioning and mixing of the gas and air, as I have stated; but I do not confine myself to any precise construction or arrangement of the broiling device so long as it is perforated and carried by the supply-pipe.

Having thus described my invention, what I claim as new, and desire to secure by Letters Patent, is—

1. In an air and gas mixer, the combination of a cylinder for containing water, a screw-wheel consisting of a drum having a length greater than its diameter, a central shaft mounted in said cylinder, a chamber at one end, and five spirally-arranged partitions forming chambers open at their ends and having a pitch that will effect the simultaneous closing and opening of the inlet and the outlet ends of said chambers in relation to a water-line K in the rotation of said wheel, and mechanism for rotating said screw-wheel, whereby the said chambers will be water sealed between their receiving and discharging ends, the gas received within said chambers at its normal pressure and delivered therefrom at a low pressure, the wheel balanced, and the flow of gas through it automatically cut off when the machine is at rest, substantially as described.

2. In an air and gas mixer, the combination of two measuring-wheels C and D, one for gas and one for air, each having a chamber J at one end, and each constructed with five spirally-arranged partitions forming chambers open at their ends and having a length greater than the diameter of the wheel and a considerable pitch, a cylinder A and B for each wheel, respectively, containing a sealing-liquid for the said spiral chambers, the cylinder A having a pipe W for admitting gas under pressure and an elbow-pipe I for the escape of the measured gas, the cylinder B having an inlet elbow-pipe I$^2$, open to the outer air, and an outlet-pipe L, and a mixing-chamber V, into which the said outlet-pipes terminate, and mechanism for connecting and rotating said wheels, whereby the gas is received and measured by the wheel C at its normal or meter pressure and delivered at a low pressure, and the air is received by induction and measured and delivered by the wheel D at the same pressure and velocity at which the gas is delivered, in the way described and for the purpose stated.

3. In an air and gas mixer, the combination of a cylinder for containing water, a screw-wheel consisting of a drum having five screw-formed division-vanes of a length greater than its diameter, a central shaft mounted in said cylinder, a chamber at one end, and a series of spirally-arranged partitions forming chambers open at their ends having the pitch described, with a register-plate mounted upon the receiving end of said drum, and mechanism for rotating said screw-wheel, substantially as described, for the purpose stated.

In testimony whereof I affix my signature in presence of two witnesses.

GEORGE R. COTTRELL.

Witnesses:
    F. L. BROWNE,
    ARTHUR BROWNING.